United States Patent [19]

Herbrechtsmeier et al.

[11] 4,370,151

[45] Jan. 25, 1983

[54] PROCESS AND APPARATUS FOR GASSING LIQUIDS

[75] Inventors: Peter Herbrechtsmeier, Hofheim am Taunus; Hans Schäfer, Bad Soden am Taunus; Rudolf Steiner, Sulzbach, all of Fed. Rep. of Germany

[73] Assignee: Hoechst Aktiengesellschaft, Frankfurt am Main, Fed. Rep. of Germany

[21] Appl. No.: 247,133

[22] Filed: Mar. 24, 1981

[30] Foreign Application Priority Data

Mar. 26, 1980 [DE] Fed. Rep. of Germany ....... 3011613

[51] Int. Cl.³ .................... B01F 3/04; B01D 19/00
[52] U.S. Cl. .......................... 55/38; 55/51; 55/196; 210/220; 261/121 R
[58] Field of Search ............. 55/38, 89, 93, 223, 55/229, 244, 248, 257 R, 51, 196; 210/188, 194, 195.1, 199, 220, 221.1, 256, 262; 261/21, 22, 121 R, 125

[56] References Cited

U.S. PATENT DOCUMENTS

| 996,561 | 6/1911 | Bradley | 210/760 |
|---|---|---|---|
| 1,216,059 | 2/1917 | Bosch | 55/93 X |
| 1,476,108 | 12/1923 | Schmidt | 261/21 X |
| 2,020,850 | 11/1935 | Myhren et al. | 261/21 X |
| 2,718,275 | 9/1955 | Banks | 55/38 |
| 2,720,280 | 10/1955 | Doyle | 55/38 |
| 3,296,774 | 1/1967 | Hoogendoorn et al. | 55/93 X |
| 3,617,033 | 11/1971 | Ichikawa et al. | 261/21 |
| 4,104,166 | 8/1978 | LaRaus | 261/21 X |
| 4,124,660 | 11/1978 | Sterlini | 55/257 R X |

FOREIGN PATENT DOCUMENTS

| 2556328 | 6/1977 | Fed. Rep. of Germany | 210/760 |
|---|---|---|---|
| 2734453 | 2/1979 | Fed. Rep. of Germany | . |
| 2257327 | 8/1975 | France | . |

Primary Examiner—Robert H. Spitzer
Attorney, Agent, or Firm—Curtis, Morris & Safford

[57] ABSTRACT

The invention provides a process for multistep gassing of liquids streaming downward in a gassing apparatus, which comprises using a gassing apparatus consisting of at least two superposed downstream parts, wherein the gas is fed in at the upper end of each downstream part and fresh gas is fed in exclusively at the upper end of the lowest downstream part, the gas bubbles are separated at the lower end of each downstream part and the separated gas bubbles are discharged to the outside and recycled to the next downstream part above.

The invention provides furthermore a corresponding gassing apparatus.

7 Claims, 1 Drawing Figure

U.S. Patent
Jan. 25, 1983
4,370,151
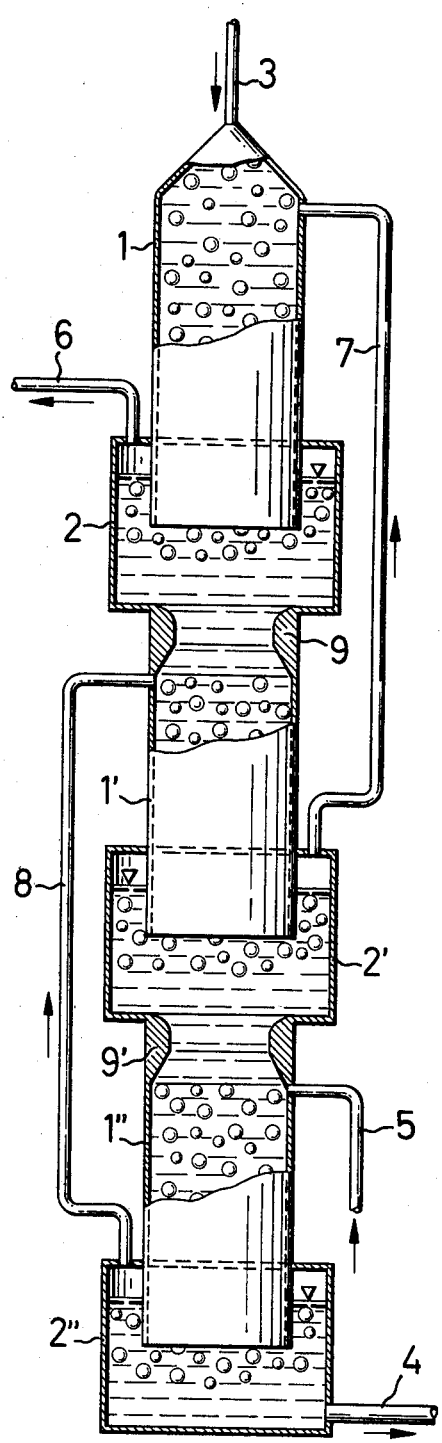

PROCESS AND APPARATUS FOR GASSING LIQUIDS

For carrying out gas/liquid reactions, processes are known according to which the gas is introduced into a liquid streaming down in vertical direction, and is forwarded in this vertically descending liquid current in the form of bubbles (see for example Chem.-Ing. Techn. 50 (1978), p. 944 sqq.). In the case of purely physical absorption without subsequent chemical reaction, this parallel current process allows to attain at most an absorption degree which corresponds to one theoretical absorption step only. Therefore, it is often necessary to series-connect several absorbers. This is valid, too, in the case of a subsequent chemical reaction, since the hitherto attained absorption degrees are often insufficient for this purpose.

It is therefore the object of the present invention to overcome the disadvantages of the state of the art and to provide an operation mode which, using one single gassing apparatus, allows to attain an absorption degree corresponding to more than one theoretical absorption step even in the case of a pure physical absorption. A further object of the invention is to provide a corresponding gassing apparatus. For achieving these objects, combined parallel current and countercurrent flow of gas phase and liquid phase as well as a gassing apparatus of cascade design are proposed.

The invention provides therefore a process for multistep gassing of liquids streaming downward in a gassing apparatus, which comprises using a gassing apparatus consisting of at least two superposed downstream parts, wherein the gas is fed in at the upper end of each downstream part and fresh gas is fed in exclusively at the upper end of the lowest downstream part, the gas bubbles are separated at the lower end of each downstream part and preferably more than 90% of the separated gas bubbles are discharged to the outside and recycled to the next downstream part above.

The invention provides furthermore an apparatus for multistep gassing of liquids streaming downward, consisting substantially of a cylindrical vessel closed at least at the top, and inlet and outlet openings for the liquid and the gas, wherein the cyclindrical vessel consists of at least two superposed downstream parts, each downstream part having a gassing device at its upper end, an enlargement for reducing the downstream speed in order to separate gas bubbles is arranged between two adjacent downstream parts each and at the lower end of the lowest downstream part, each enlargement is provided with a gas outlet, and, in order to allow countercurrent flow, the gas outlet of the enlargements beginning with the second from above are connected via a tubular duct with the gas inlet of the corresponding next downstream part above. wever, being fed in at the upper end of the lowest downstream part of the gassing cascade only. As gas distributors, there may be mentioned for example perforated plates arranged preferably radially with respect to the circumference of the corresponding downstream part, sintered plates, nozzles, etc. The hole diameter of these gas distributors which influences the average bubble diameter of the gas conveyed downward is generally below 2, preferably from 0.1 to 1, mm. The average bubble diameter depends furthermore on the speed of the liquid flow (so-called superficial velocity), as well as on surface tension and viscosity of the liquid. In order to allow the length of the absorbers to be kept as short as possible, the average bubble diameter generally should not exceed 10 mm; preferably, it is from 0.2 to 6 mm. It has to be taken into consideration that large bubbles have a higher ascending speed than small ones, thus reducing control of the system.

The superficial velocity determines the residence time of the gas in the absorber and is advantageously adjusted to a value of below 2 m/sec in order to ensure a substantially short absorber distance. Preferably, however, it is below 1 m/sec; a value of, for example from 0.15 to 0.6 m/sec at a diameter ratio of gas separator/downstream part of from 1.5 to 2.0, and a ratio of gas separator length/gas separator diameter of from 0.5 to 2.0 giving especially good results, as well as a superficial velocity of from 0.6 to 1.0 m/sec at a diameter ratio of from 2.0 to 3.0 and a ratio of gas separator length/gas separator diameter of from 2.0 to 5.0. Especially preferred is an superficial velocity of from 0.2 to 0.4 m/sec. The theoretical lower limit is set by the point where the downstream speed of the liquid and the ascending speed of the gas bubbles is identical, so that the gas bubbles are in a state of suspension. This value, depending on the size of the bubbles, the composition of the gas, the temperature, the kind of liquid and the gas/liquid density ratio, is for example about 0.18 m/sec in the case of water and oxygen.

The gas bubbles are separated according to the invention preferably by gravitational force, especially by reducing the velocity of the liquid flow in adequate manner. This gravity separation may be promoted by providing the downstream parts with apertures or baffle plates favoring the formation of great bubbles.

The gas bubbles may be furthermore separated by centrifugal force, optionally in combination with the gravitational force. Separation by centrifugal force, however, generally involves a loss in pressure, so that gravity separation according to the invention is preferred.

The velocity of the liquid flow in the embodiment which is particularly preferred for this purpose, is reduced in an enlargement positioned between two adjacent downstream parts each and at the lower end of the lowest downstream part.

The incoming gas/liquid jet is braked in this enlargement by pulse exchange to such an extent that the gas is separated from the liquid. Because of the conditions in a turbulent free jet it was to be expected that at least those gas bubbles situated in the center of the jet would be carried along over a considerable distance, that is, up to 2 m and more under the conditions of Example 1. Surprisingly, however, it was observed that complete separation of the gas bubbles was achieved after a very short distance already, that is, about 0.12 m, under the conditions of Example 1. It was furthermore surprising to state that the gas bubbles remount to the downstream part situated above either not at all or to an insignificant extent only, and that a component acting in cross-sectional direction of the gas separator ensures that gas bubbles substantially ascend in its rim zones only. Thus, the separated gas bubbles can be removed without disturbing the liquid streaming downward, for example in a lateral annulus, and recycled to the gas inlet of the next downstream part above in order to produce the countercurrent effect utilized in accordance with the invention. It is furthermore very surprising that the gas separation proceeds the better the higher the gas content is, despite the conjecture that due to the accordingly rising liquid speed and the correspondingly reduced free tube volume the gas bubbles would be swept downward to an increased extent.

In this connection it has furthermore been observed that a formal superficial velocity (=velocity relative to the free cross-section of the gas separator) of 0.19 m/sec only is sufficient for obtaining complete gas separation, if the superficial velocity in the downstream part situated before is, for example, 0.47 m/sec. This was not to be expected either, because a superficial velocity of 0.19 m/sec in the dowstream part ensures downward flow operation without ascension of gas bubbles. Under these conditions the effective length of the gas separator, measured from the lower end of the immersed downstream part to the lower end of the separator, can be less than 0.7 m.

In the particularly preferred embodiment according to the invention the superficial velocity rises again in the downstream part following the gas separator, to attain the value prevailing before the gas separator. However, it has been observed that a considerable amount of gas bubbles formed on gassing in this downstream part remounts to the gas separator above and is separated there together with the gas fed in at the corresponding inlet of the downstream part positioned on top of this separator, and that the amount of gas bubbles is the larger the lower the liquid throughput is. This backmixture of bubbles results, among others, in a reduced absorption degree due to the short residence time of the bubbles and the adversely affected countercurrent effect.

This difficulty occuring especially in the case of a low superficial velocity can be overcome in a surprisingly simple manner by raising this speed immediately after the gas separator and before the gas inlet to a value which is clearly higher than the superficial velocity in the remaining space of the downstream part. In accordance with the invention, this operation mode is therefore preferred. The speed increase is generally in a range of from 60 to 300, preferably 80 to 170, percent, and it depends on the kind of liquid, the difference of gas/liquid density, the gas amount, the average bubble diameter and the absolute superficial velocity. Thus, the required rate of increase is the higher the smaller the difference of gas/liquid density, the lower the superficial velocity, and the larger the average bubble diameter (that is, amount and diameter of large-size bubbles) is. In the case where the abovementioned percentage of increase is exceeded, a disadvantageous suction effect on the gas bubbles may occur in the gas separator positioned above. Furthermore, the energy consumption required for maintaining the flow through the gassing apparatus increases. Moreover, a too high pressure loss in the downstream reactor is disadvantageous, because the gas transport in countercurrent without intermediate compression is thus impeded. For, in the system of the invention the gas is normally conveyed without such intermediate compression, because the hydrostatic pressure increases on the way from the top to the bottom of the reactor.

The average residence time of the ozone-containing gas in each downstream part is generally from about 0.2 to 60, preferably 0.5 to 10, seconds per meter of downstream part length. The volume ratio of liquid to gas is generally above 4:1, preferably above 7:1. Generally, the absorption degree increases with increasing volume ratio of liquid to gas. In principle, a ratio of below 4:1 is allowed, but it increases the risk of formation of large bubbles and thus formation of a gas cushion at the top of the gassing apparatus, which cushion may cause forced emptying of the apparatus.

The process of the invention may be carried out under normal pressure. For increasing the absorption degree, however, it is advantageous to operate under an elevated pressure of, for example, up to 60, preferably 1 to 16, bar.

According to the operation mode of the invention, that is, combination of parallel current and countercurrent, fresh gas is fed in only via the gas inlet of the lowest downstream part and, after having passed through the individual steps, leaves the gassing apparatus via the gas outlet of the top gas separator. On the other hand, the liquid is fed in at the top of the first downstream part and leaves the apparatus at the liquid outlet of the lowest gas separator.

As already mentioned, the apparatus of the invention consists of at least two downstream parts (cascade stages) which preferably have identical length and identical diameter. The dimensions are not critical in principle, and depend on the intended absorption degree and the number of downstream parts integrated. Generally, such downstream parts will be preferred the ratio of height of nominal width of which is greater than 1, preferably greater than 3.

A length of from 0.2 to 3, preferably 0.3 to 1, meter has proved to be advantageous for a downstream part. The corresponding nominal width results automatically in each case from the intended throughput of liquid and gas.

Each downstream part is provided at its upper end with a gas inlet and the gas distributors described before. Preferably, the gas inlet is positioned below the upper end of each downstream part by 0 to 30% relative to the total length of the downstream part. When providing the tube concentration preferred in accordance with the invention, the gas inlet of the second and any subsequent downstream part is positioned immediately after this tube throat.

Preferably, the top of the first downstream part as seen from above is pointed (tapered), because formation of a gas cushion is thus prevented in a surprisingly simple manner. The inclination of this point (taper) is not critical, generally the angle between the walls forming the point (taper) is from 3° to 15°, preferably 5° to 10°. The inlet opening for the liquid phase is preferably at the peak of this point (taper).

The enlargement (gas separator) arranged after each downstream part consists of a recipient the diameter of which is larger than that of the two downstream parts above and below. The diameter has to be chosen in such a manner that by means of this cross-sectional enlargement the liquid speed in this zone is reduced to a value which is exceeded by the speed of the ascending gas bubbles, thus causing separation of gas phase and liquid phase. The exact diameter to be chosen is easily determined by some routine measuring. The ratio of gas separator diameter to downstream part diameter is advantageously from 1.4:1 to 3:1, preferably 1.6:1 to 2.5:1, and the ratio of nominal width to height of the gas separator is advantageously from 0.5:1 to 5:1, preferably 0.5:1 to 2:1.

Due to the preferred projection of the downstream part positioned above into the gas separator, a sort of a chamber is formed at the upper end of which the gas outlet opening is arranged. The immersion depth of the downstream part in question is in a range of from 10 to 80, preferably 20 to 40, percent of the gas separator height.

As already mentioned, for preventing the gas bubbles to be backmixed the downstream part after the gas separator is provided with a contraction above the gas inlet, which amounts generally to 60 to 300, preferably 80 to 170, percent of the corresponding downstream part cross-section, and to 20 to 60, preferably 20 to 40, percent of the corresponding downstream part length. A larger dimensioned contraction may cause the cited suction effect; furthermore, of course, increase in contraction means increase of pressure loss and energy consumption. The contraction is preferably designed as Venturi tube, although it may be produced alternatively by appropriate perforated plates, screens, mouths, nozzles, sintered plates or wire cloth. In this case, however, there is the risk of interruption of the liquid flow and formation of a gas cushion.

In addition to the gas outlet, the last gas separator is provided furthermore with an outlet opening for the liquid streaming through the apparatus.

Suitable materials for the apparatus of the invention are all those normally used for such purposes, for example steel, stainless steel or glass; the latter being appropriate especially for aggressive liquids or aggressive gases.

In certain cases it may be advantageous to series-connect several of the gassing apparatus of the invention.

The process and the apparatus of the invention are suitable for the absorption of most different gases in most different liquids, optionally with subsequent reaction of the absorbed gas with possible components or impurities of the liquid. There may be mentioned for example absorption of nitrous gases for the formation of nitric acid, of phosgene for hydrolysis, or gassing of a sulfite solution with air for oxidation purposes, furthermore gassing of water with ozone-containing gases in the field of drinking water conditioning or waste water purification. Especially advantageous is the operation mode as described in German Offenlegungsschrift No. 2,556,328, where a partial current only of the water to be treated is loaded with ozone under elevated pressure, which current is then remixed with the main water current under normal pressure. The packed column described for this application in the above Offenlegungsschrift would have to be replaced by the downstream cascade absorber of the invention, and the ozone-containing gas fed in at the head of the lower absorber would have to be conveyed upward in countercurrent to the liquid.

On the other hand, the apparatus of the invention can likewise be applied as desorber for removing gas dissolved in a liquid.

The apparatus of the invention is distinguished by its compact over-all dimensions, and allows to attain a high absorption degree at high throughput rate due to the high number of steps. It allows furthermore countercurrent operation in one single downstream reactor unit.

The invention will be better understood by reference to the accompanying drawing, which illustrates the process and the apparatus of the invention. The downstream cascade absorber shown consists of three downstream parts 1, 1' and 1" and the corresponding gas separators (enlargements) 2, 2' and 2". The top of the upper downstream part 1 is pointed. 3 represents the inlet and 4 the outlet for the liquid. Fresh gas is fed in via 5, while gas is let off from the absorber via 6. In order to produce the countercurrent effect, the gas from the gas separators 2' and 2", respectively, is conveyed via ducts 7 and 8, respectively, to the gas inlet of the corresponding next downstream part above. 9 and 9' represent the Venturi-type tube contractions.

The following examples illustrate the invention.

EXAMPLE 1

The gassing apparatus corresponded to that of the drawing and consisted of two tube-shaped downstream parts made from glass having a length of 1 m each and a diameter of 0.15 m. The taper in the upper downstream part had an angle of 10°. The two corresponding gas separators likewise made from glass had a length of 0.5 m each and a diameter of 0.25 m. The length of the total apparatus was 2.3 m, and the immersion depth of each downstream part in the corresponding gas separator was 0.3 m. At the upper end of the lower downstream part (that is, between the upper gas separator and the second gas inlet), there was provided a Venturi-type tube contraction which had a length of 0.24 m and a diameter of 0.10 m at its narrowest point. Four radially arranged perforated plates served as gas distributors; the number of holes per plate being 128 and the hole diameter 0.5 mm. The distance of the gas inlet (the perforated plates) from the top of the corresponding downstream part was about 0.3 m.

Water was used as liquid to be gassed. It was fed in at the top of the first downstream part and had a temperature of 15° C. As gas, ozone-containing oxygen was used the ozone content of which was 2.8% by volume. The absorber apparatus was run under a pressure of 1.1 bar (absolute). At a superficial velocity of 0.24 m/sec a constant average bubble diameter of about 5 mm had soon established itself.

The liquid throughput was 15 m$^3$/h and that of the gas 432 normal liters/h.

After the first step, an ozone absorption degree of 94.9% was stated and 99.8% were observed after the second step. The absorption degree is defined according to the following equation:

$$\phi_{O_3} = (n°_{O_3} - N^4_{O_3}x)/n°_{O_3}$$

in which $n°_{O_3}$ = mols $O_3$ in the gas fed in before the first absorption step, and $n^4_{O_3}x$ = mols $O_3$ in the gas let off after the step in question.

For determining the quantitative current balance in this example, the gas amounts leaving each gas outlet duct were measured by means of a gas meter. The amount of gas let off which coincided with the gas current fed in while taking into consideration the gas amount absorbed in the liquid clearly proved a quantitative gas separation after each step.

In contrast thereto, measuring of the gas amounts without Venturi contraction provided in the apparatus had the following result: although the efficiency of the gas separator was not adversely affected, about 70% however of the gas fed in below the gas separator mounted directly to the gas separator and were not conveyed downward as intended in the downstream part.

EXAMPLE 2

In order to show that the gas separation can be still improved with rising gas amount, the following test was carried out: The apparatus according to Example 1

(diameter of the narrowest point of the Venturi-type nozzle in this case: 0.095 m) was run at a constant superficial velocity of 0.35 m/sec, and the gas throughput (and thus the gas content) was varied. The gas separation rate was determined by means of a gas meter each at the gas inlet and gas outlet of the upper downstream part. At a gas throughput increased from 86 to 345 and finally to 530 liters/h the separation rate increased from 92 to 97 and then 99 percent.

What is claimed is:

1. A multistep process for contacting a liquid with a gas, the liquid streaming vertically downward in a gassing apparatus, said gassing apparatus comprising at least two superposed downstream parts, with the liquid passing downward through a constriction joining the lower end and the upper end of successive such superposed downstream parts, wherein the gas is fed in at the upper end of each downstream part and fresh gas is fed in exclusively at the upper end of the lowest downstream part, gas bubbles are separated at the lower end of each downstream part by reducing the velocity of the liquid flow in adequate manner between two adjacent downstream parts and at the lower end of the lowest downstream part, the separated gas bubbles are discharged to the outside and recycled to the next downstream part above, wherein the speed of the liquid stream immediately after gas bubble separation is increased vertically downward at said constriction before feeding in further gas in such manner that backmixture of bubbles between the immediately subsequent downstream parts is prevented.

2. The process defined in claim 1 wherein the velocity of the liquid stream for transporting the gas bubbles downwardly from the upper to the lower end of each downstream part is below about 1 meter per second.

3. A process for gassing a liquid which comprises passing a continuous stream of liquid vertically downward and successively through multiple stages, each stage having an upper portion of minimum cross-section, an intermediate portion of intermediate cross-section and a lower portion of maximum cross-section whereby the velocity of the stream of liquid is correspondingly reduced stepwise from a maximum to a minimum velocity as it moves successively through the upper, intermediate and lower portions of each stage and is increased again to its maximum velocity as it passes vertically downward through a constriction joining the lower portion of each stage with the upper portion of the next successive stage;

introducing a continuous stream of gas into the stream of liquid in the upper part of the intermediate portion of a lower stage;

collecting non-absorbed bubbles of gas in the lower portion of said lower stage;

reintroducing a continuous stream of gas from said non-absorbed bubbles into the stream of liquid in the upper part of the intermediate portion of the next higher stage;

collecting non-absorbed bubbles of gas in the lower portion of said next higher stage; and adjusting the flow velocity of the stream of liquid so that it exceeds the speed of the bubbles through the stream in the upper portion of each stage, whereby said bubbles are moved downwardly with the stream of liquid within the intermediate portions of each stage, are permitted to move upwardly against the stream of liquid within the lower portions of each stage and are positively prevented from rising from each area of entry into the lower portion of the next upper stage by the maximum downward velocity of the liquid in the upper portion of the stage into which the gas is introduced.

4. Apparatus for multistep gassing of a stream of liquid flowing downwardly therethrough, which comprises:

(a) first means for mixing the liquid stream with fresh gas, said first mixing means having an upper portion and a lower portion, said upper portion having a liquid inlet opening and a fresh gas inlet opening formed therein, said fresh gas inlet opening being disposed below said liquid inlet opening, said lower portion having an opening formed therein, the fresh gas mixing with the liquid stream and being transported vertically downward thereby in the form of gas bubbles through said opening in the lower portion;

(b) first means for separating the gas bubbles from the liquid stream thereby allowing the gas bubbles to recombine for a first time, said first separating means being superposed below the first mixing means and in communication therewith and having a width which is greater than that of the first mixing means, said first separating means having an upper portion and a lower portion, said upper portion having an opening formed therein dimensioned to receive the lower portion of the first mixing means, the lower portion of the first mixing means extending partially into the interior of the first separating means thereby defining with the upper portion of the first separating means an area therebetween for recovering the gas recombined for the first time, said upper portion of said first separating means having an opening therein for outlet of said gas recombined for the first time, said lower portion of the first separating means having an opening formed therein through which the liquid stream flows vertically downward;

(c) second means for mixing the liquid stream with the gas recombined for a first time, said second mixing means being superposed above said first mixing means and in communication therewith, said second mixing means having an upper portion and a lower portion, said upper portion having a liquid inlet opening and a gas inlet opening formed therein, said gas inlet opening of said second mixing means being in communication with the gas outlet opening in said first separating means, said lower portion having an opening formed therein, the gas recombined for a first time mixing with the liquid stream and reforming gas bubbles which are transported vertically downward thereby through said opening in the lower portion; and (d) second means for separating the reformed gas bubbles from said liquid stream thereby allowing the reforming gas bubbles to recombine for a second time, the second separating means being in communication with and interposed between the first and second mixing means and having a width which is greater than that of the second mixing means, said second mixing means having an upper portion and a lower portion, said upper portion having an opening formed therein dimensioned to receive the lower portion of the second mixing means, the lower portion of the second mixing means extending downward partially into the interior of the second mixing means thereby defining with the upper portion of the second separating means an area therebetween for recovering the gas recombined for a second time, said upper portion of said second separating means having an opening formed therein for outlet of said gas recombined for a second time, said lower portion of the second separating means having an opening at the bottom thereof unitary with a similar opening at the top of the first mixing means through which the liquid stream flows vertically downward.

5. The apparatus defined in claim 4 wherein said unitary opening is formed as a constriction interposed between said second separating means and said first mixing means to prevent a back mixture of gas bubbles.

6. The apparatus defined in claim 5 wherein the constriction is in the form of a Venturi nozzle.

7. The apparatus defined in claim 4 which further comprises means for distributing gas, said gas distributing means being positioned within the first and second mixing means below the fresh gas inlet opening and the recombined gas inlet opening respectively thereof, said gas distributing means having a plurality of radially arranged perforated plates.

* * * * *